(No Model.)

J. F. & F. L. HOMAN.
APPARATUS FOR CATCHING STAR FISH.

No. 297,079. Patented Apr. 15, 1884.

UNITED STATES PATENT OFFICE.

J. FRANK HOMAN AND FRANKLIN L. HOMAN, OF NEW HAVEN, ASSIGNORS TO LANCRAFT BROS., OF FAIR HAVEN, CONNECTICUT.

APPARATUS FOR CATCHING STAR-FISH.

SPECIFICATION forming part of Letters Patent No. 297,079, dated April 15, 1884.

Application filed December 10, 1883. (No model.)

*To all whom it may concern:*

Be it known that we, J. FRANK HOMAN and FRANKLIN L. HOMAN, of New Haven, in the county of New Haven and State of Connecticut, have invented a new Improvement in Apparatus for Catching Star-Fish; and we do hereby declare the following, when taken in connection with accompanying drawings and the letters of reference marked thereon, to be a full, clear, and exact description of the same, and which said drawings constitute part of this specification, and represent, in—

Figure 1:
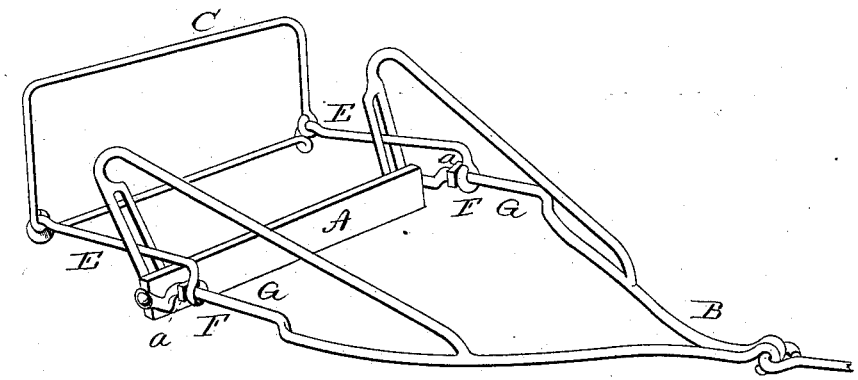
Figure 2:
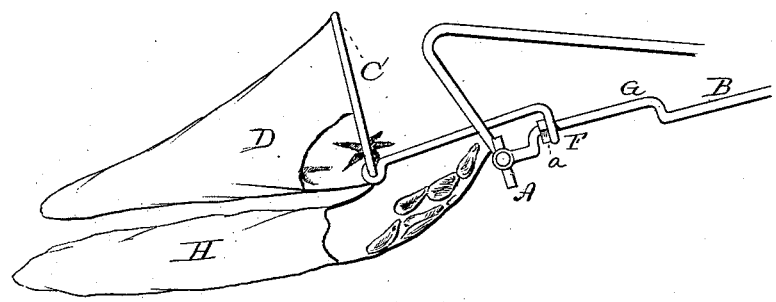

Figure 1, a perspective view; Fig. 2, a side view.

This invention relates to an apparatus having for its object the removal of star-fish from oyster-beds.

The great destruction of oysters due to star-fish is well known. Various expedients have been resorted to to prevent the attack of star-fish upon oyster-beds, or to destroy the fish without injury to the oyster, but only with partial success.

The object of our invention is the construction of an apparatus which may be drawn over oyster-beds and separate the fish from the oysters, and trapping the fish, so that they may be destroyed; and it consists in a dredge or drag constructed so as to be drawn over the beds of oysters and start the fish from the oysters to which they may have been attached or over which they may be, and combining with such a drag a net or suitable receptacle arranged in rear of and open above the plane of the dredge, so that the fish, when disturbed by the drag, naturally rising, will be caught by the net or receptacle, while the oysters which may have been disturbed by the drag or dredge will fall back between the mouth of the receptacle and the dredge, and be left on the bed or enter a separate receptacle, as more fully hereinafter described.

A is the drag or dredge, which consists of a bar having a bail-like extension, B, from it, by which it may be drawn over the surface of the bed, and which may be substantially like a common oyster-dredge.

In rear of the bar A is a frame, C, of suitable material—say iron rods bent to the required form—and arranged so as to stand in nearly a vertical position, its lower edge a little distance in rear of the drag A. To this frame a net or other suitable receptacle, D, is attached, the frame extending the open end of the net, and so as to form the mouth thereof. It is attached to the drag in any suitable manner, here represented as by an arm, E, at each side, which extend forward, and at their forward end fitted with a loop or sleeve, F, around parallel bars G, here represented as forming a part of the frame B. The arms are adjustable on the bars G, so as to adjust the position of the frame C with relation to the drag A—that is, so that the mouth of the receptacle may be arranged nearer to or farther from the drag A, as circumstances may require. Stops *a* are arranged on the bar G to govern the position of the receptacle C, and as they are moved forward the space between the receptacle and the drag will be diminished, or in the opposite direction the reverse. The frame should have a certain amount of freedom to adapt itself to the unevenness of the surface; hence the loops F are made loose upon the bar G, so as to permit the frame to swing up or down, as the case may be, or one end up while the other is down—that is, the connection between the frame C and the drag is of such a loose character as to give freedom of movement to the frame C. The apparatus is sunk upon the bed in the usual manner of sinking a dredge, and in like manner is drawn over the bed of oysters. The drag A will start the oysters, materially changing their position, and so as to disturb any star-fish which may be fixed thereon, and thus disturbed the fish naturally rises, but slowly. The dredge A will pass under the fish, and, because of the tendency of the fish to float when liberated, it will be caught by the advancing receptacle D, entering through the mouth or frame C. The oysters which are thus disturbed fall back over the drag and between the drag and frame, so as to remain upon the bed, while the fish enter the receptacle D. The space between the drag A and the mouth of the receptacle is such as to permit the oysters to fall back onto the bed, and yet not so far away as to permit the fish to again settle upon the oysters before it will have reached the mouth of the receptacle. In some cases it may be desirable to take oysters at the same time the fish are caught. In that case the mouth of the oyster-net H is attached, one edge to the drag and the other, say, to the lower bar of the frame C, as shown, so that the oysters falling over the drag will enter the mouth of the oyster-net, while the fish will pass into the net above.

The construction of the frame whereby the moving power is attached to the drag, or whereby the frame of the fish receptacle or trap is attached to the drag, may be varied to adapt the apparatus to different localities, such construction being immaterial to our invention, the essential feature of which is a drag provided with means by which it may be drawn over and upon the surface of the bed, combined with an open-mouthed receptacle attached to or in substantial connection with said bar, and in rear of and above the plane of the drag, whereby a space is left in rear of the drag and between it and the mouth of the receptacle.

We claim—

The combination of the drag A, provided with means, substantially such as described, whereby it may be drawn over the surface of the oyster-bed, with an opened-mouthed receptacle, D, in rear of the drag, the mouth arranged to open above the plane of the drag, and so as to leave an open space downward between the drag and the mouth, substantially as described.

J. FRANK HOMAN.
FRANKLIN L. HOMAN.

Witnesses:
JOHN E. EARLE,
JOS. C. EARLE.